United States Patent [19]

Krume

[11] 3,783,959
[45] Jan. 8, 1974

[54] SKI VEHICLE WITH IMPROVED FRONT SUPPORT MEANS

[76] Inventor: Robert E. Krume, 20440 Anza Ave. No. 224, Torrance, Calif.

[22] Filed: Mar. 6, 1972

[21] Appl. No.: 231,877

[52] U.S. Cl. .............................. 180/6 A, 280/21 A
[51] Int. Cl............................................. B62m 29/00
[58] Field of Search ................... 180/5 R, 6 R, 6 A; 280/7.14, 7.12, 21 A, 16

[56] References Cited
UNITED STATES PATENTS

| | | | |
|---|---|---|---|
| 3,583,507 | 6/1971 | Trautwein | 180/5 R |
| 2,323,847 | 7/1943 | Sampsell | 280/21 A |
| 3,630,301 | 12/1971 | Henricks | 280/7.14 X |

FOREIGN PATENTS OR APPLICATIONS

| | | | |
|---|---|---|---|
| 986,197 | 3/1951 | France | 180/5 R |

*Primary Examiner*—Leo Friaglia
*Attorney*—Henry M. Bissell

[57] ABSTRACT

A ski vehicle with improved front support means is provided which includes a two-wheeled powered vehicle body frame, seat, motor, powered rear support wheel and steering means, including handle and front wheel frame. The front support means for the vehicle is in the form of a bracket secured to the wheel frame, a ski support assembly pivotably connected to the bracket to permit transverse rotation of the former relative to the latter, a pair of skis pivotably connected to the spaced depending legs of the assembly and means interconnecting the bracket and each ski, whereby rotation of the bracket and frame in a transverse plane effects like rotation of the skis. The skis can also rotate upwardly and downwardly, the extent being controlled by limit means. Means may also be provided to limit the extent of transverse rotation of the skis and to releasably lock the bracket and ski support assembly together for ease of transportation.

20 Claims, 6 Drawing Figures

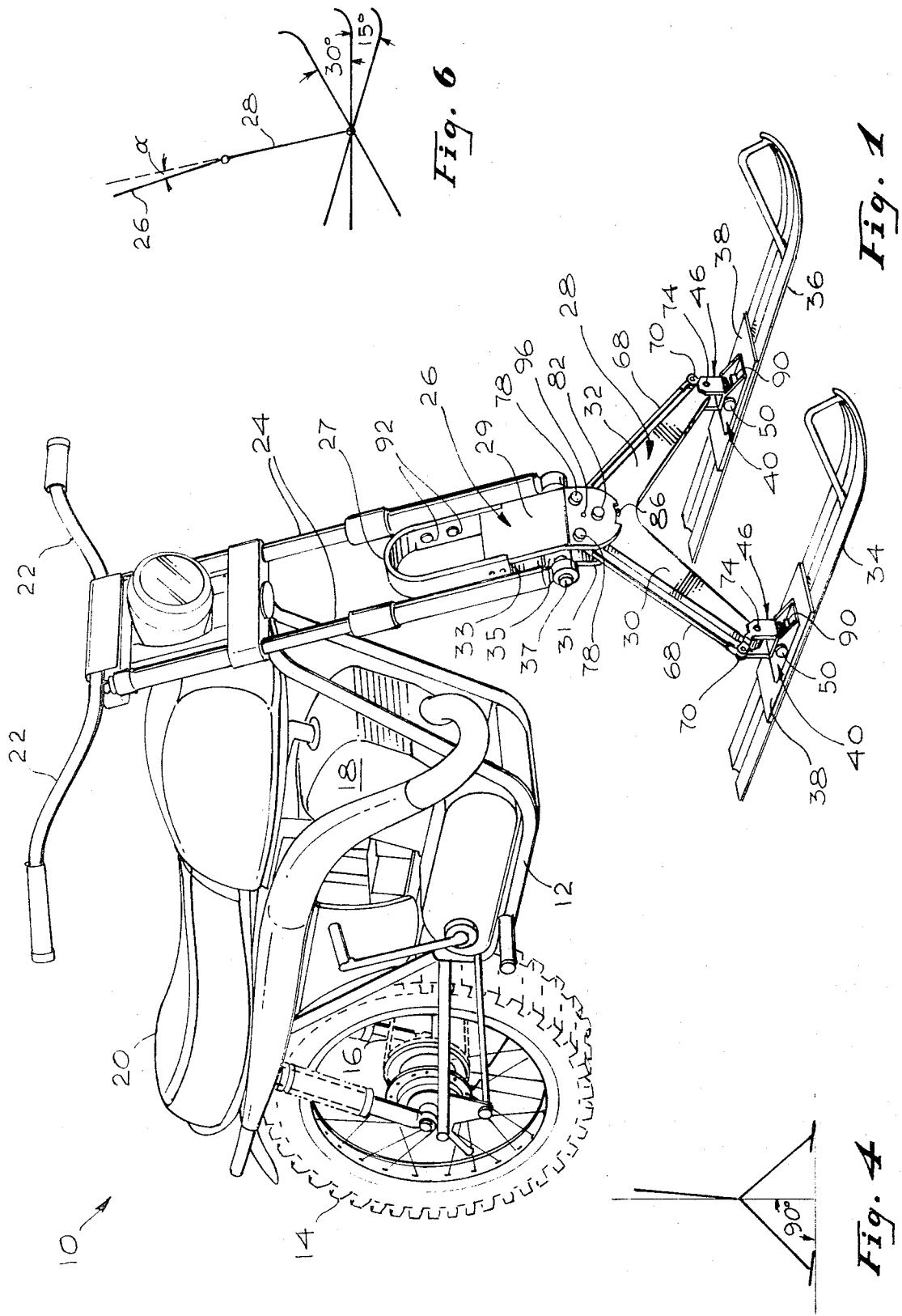

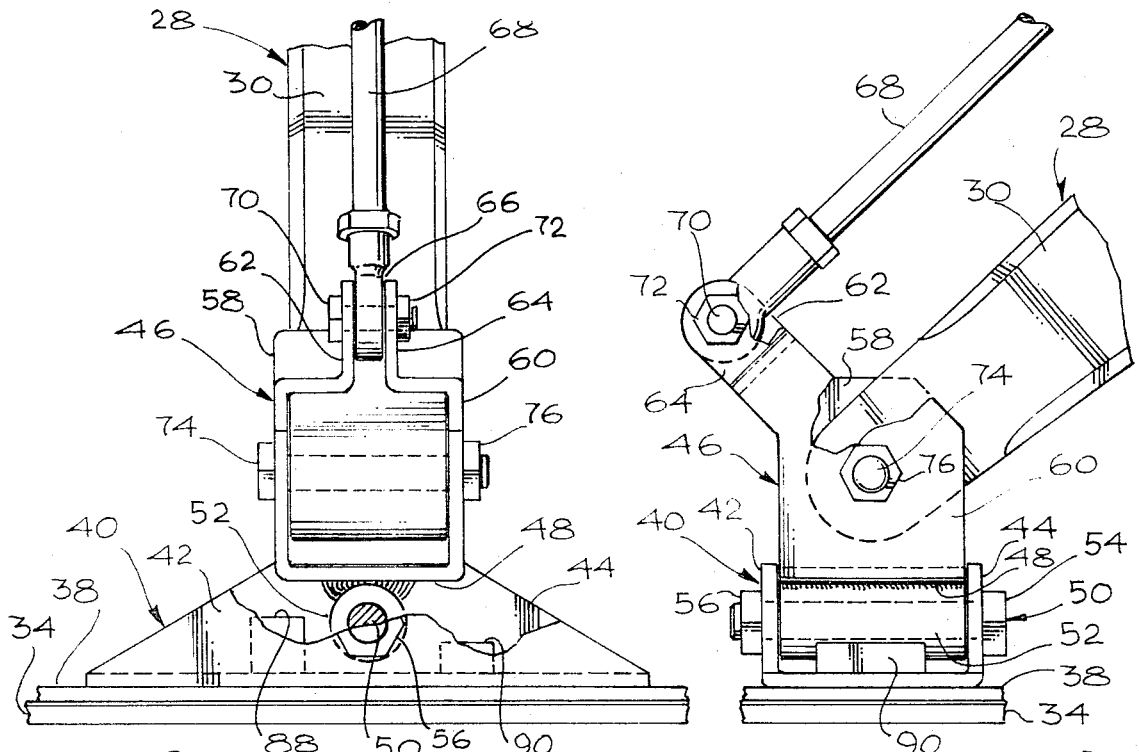
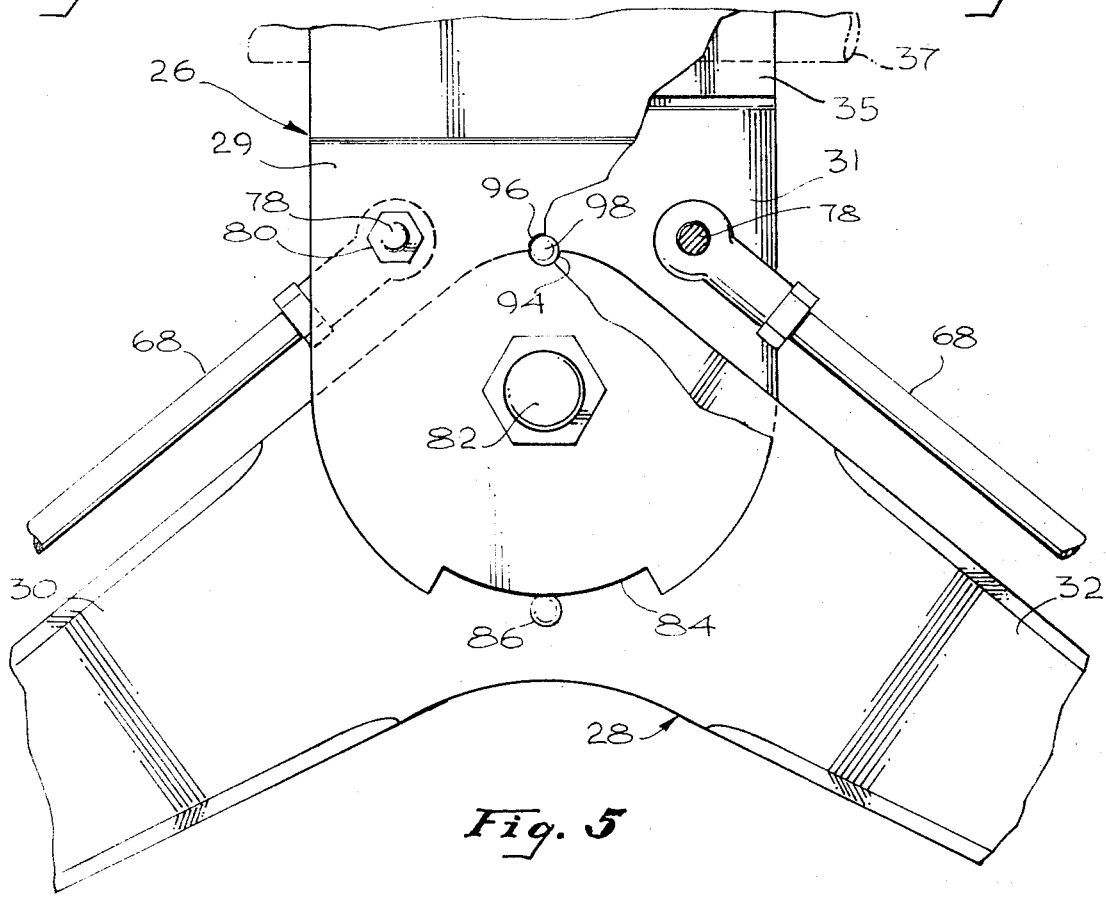

SKI VEHICLE WITH IMPROVED FRONT SUPPORT MEANS

BACKGROUND

1. Field of the Invention

The present invention generally relates to vehicles and more particularly to two-wheeled powered ski vehicles with improved front support means.

2. Prior Art

Various types of powered vehicles for use on snow and ice are in current use. Particularly popular are those so-called snowmobiles which generally are characterized by having relatively large flat-bottomed cabin housings. The housings are adapted for use by one or more passengers and are usually supported on either broad movable powered endless treads with one or a pair of front skis or on long parallel runners or the like, with or without skis. In the latter case, the vehicle is usually powered by a rearwardly-directed motor-driven propeller. The skis or runners of such vehicles usually are fixedly secured and can be turned only in the horizontal plane. Such vehicles are useful for certain types of transportation and work activities and, moreover, are increasingly used as a means of recreation and sport.

However, such vehicles are subject to certain disadvantages, including considerable bulk and lack of true maneuverability comparable to that obtained by skiers on skis or by ice skaters. Such vehicles also may be relatively slow, particularly if large powerful motive means are not employed therewith. Furthermore, because of their bulk, they are difficult to store and to transport to the sites where they are used. Moreover, they are expensive to purchase, store, maintain and repair.

SUMMARY OF THE INVENTION

The improved ski vehicle of the present invention overcomes the foregoing difficulties. It is substantially as set forth in the Abstract above. Not only is it relatively inexpensive to purchase, store, repair and maintain, but it can be easily assembled from the main components of a motorbike or motorcycle and can be dismantled easily when it is desired to re-use the motorbike or motorcycle as such in conventional form. Only the front wheel and fender of the motorbike or cycle need be removed in order to convert the bike or cycle into the desired vehicle of the invention, utilizing components as hereinafter specified. This can be accomplished in a short period of time without special tools.

The vehicle of the present invention is highly maneuverable in the snow, is capable of rapid high speed turns with maximum safety and is relatively speedy, being of lightweight construction. It duplicates in its skiing action those obtained by the skier and conventional motorcyclist, rather than the flat ski posture movements resorted to by conventional snowmobiles during turning. Accordingly, turns can be made more smoothly and rapidly for greater pleasure and efficiency with the present vehicle, rendering it ideal for winter sports activities and for transportation and hauling in snow.

The vehicle's compact size and initial low cost further suit it for use both as a pleasure and work vehicle. It is durable in construction and can be made ultra-safe by inclusion of means for limiting angles of rotation of the skis and body frame without limiting the natural type of cycle turning action involving heeling over or leaning sideways.

DRAWINGS

FIG. 1 of the accompanying drawings is a schematic perspective view of a preferred embodiment of the improved ski vehicle of the invention;

FIG. 2 is an enlarged fragmentary schematic side elevation of the lower ski-connecting portion of the vehicle of FIG. 1, taken from the right-hand side with portions broken away to illustrate certain features of internal construction;

FIG. 3 is an enlarged schematic front elevation of the portion of the vehicle of FIG. 1 shown in FIG. 2;

FIG. 4 is a schematic diagram illustrating the ski angle of the vehicle of FIG. 1 during leaning turns;

FIG. 5 is an enlarged fragmentary view, partly broken away, of the upper ski-connecting portion of the front support means of the vehicle of FIG. 1; and FIG. 6 is a schematic diagram illustrating the extent of ski rotation upwardly and downwardly permitted by limit means of the vehicle of FIG. 1.

DETAILED DESCRIPTION

Now referring more particularly to FIG. 1 of the accompanying drawings, an improved ski vehicle 10 and front support means for the vehicle are schematically illustrated in perspective view. Vehicle 10 includes a motorbike or motorcycle body frame 12, i.e., a frame of a two-wheeled powered vehicle. For the purposes of the following description, motorbike and motorcycle are equated. Supported in frame 12 for rotation is a rear support and drive wheel 14 which may be of conventional construction. Wheel 14 is powered through a drive train 16 interconnecting wheel 14 and motor 18, also disposed in frame 12. A seat 20 is secured to the upper surface of frame 12 and steering means, in the form of a pair of handlebars 22 connected to a conventional front fork or front wheel frame 24, is provided, pivotally connected to frame 12, as shown in FIG. 1. The aforesaid components may be of any suitable size and construction, but usually are of conventional design as are used in modern motorcycles.

The following components of vehicle 10 have been substituted for the conventional front fender and front wheel (not shown) of such vehicles, and form the front support means of the invention. In accordance with the present invention, front support means are provided in the form of (a) a support bracket 26 secured to fork 24, (b) a ski support assembly pivotally connected to bracket 26 and comprising a support bar 28 of inverted V configuration, including two spaced depending legs 30 and 32, (c) a pair of skis 34 and 36, connected to legs 30 and 32 respectively, and (d) connector means interconnecting each such ski with bracket 26, as hereinafter more particularly described. Bracket 26 includes an upper inverted U-shaped fork brace 27 and a pair of flat spaced plates 29 and 31 connected to the lower end thereof on opposite sides thereof through a fork block 33. An axle block 35 is also secured between plates 29 and 31 below block 33 and contains an aperture (not shown) for passage of the front wheel axle bolt 37 of vehicle 10 therethrough.

The exact manner of connection of skis 34 and 36 to their respective legs 30 and 32 is more particularly illustrated in FIGS. 2 and 3 of the drawings. Although the following description is directed to ski 34, it is equally applicable to ski 36 and like interconnecting components bear the same numerals as those indicated below. Thus, in FIG. 2, which is an enlarged schematic side elevation, partly broken away, a portion of ski 34 is shown, upon the upper surface of which is secured a flat plate 38 to the upper surface of which, in turn, is secured a U-shaped channel plate 40 (FIG. 3), the spaced parallel ears 42 and 44 of which are vertically aligned and extend longitudinally of ski 34. A generally U-shaped leg bracket 46 is also provided which is pivotably secured at its lower end 48 to plate 40 by a pivot bolt 50 extending transversely of vehicle 10 through both ears 42 and 44 and a tube 52 welded to the underside of bracket 46. Bolt 50 is provided with head 54 and nut 56 to hold the same in place. Accordingly, channel plate 40 and ski 34 can pivot about the bolt 50 relative to leg bracket 46. In doing so, ski 34 subscribes an arc in a plane generally normal to the plane of forks 24 and the nose of ski 34 may dip below or rise above horizontal.

Upstanding sides 58 and 60 of leg bracket 46 are provided with offset ears 62 and 64 inclined upwardly and laterally of vehicle 10 and ski 34. Ears 62 and 64 define a narrow passageway 66 within which is the lower end of a tie bar 68 pivotally connected to ears 62 and 64, as by a pivot bolt 70 passing through suitably aligned apertures in ears 62 and 64 and bar 68, and secured by a nut 72. The lower end of leg 30 is disposed between sides 58 and 60 and pivotably secured thereto via aligned apertures (not shown), and bolt 74 passing through sides 58 and 60 and leg 30 and secured in place by a nut 76.

The upper end of tie bar 68 is pivotably secured to bracket 26 via a bolt 78 passing through aligned apertures (not shown) in plates 29 and 31 and bar 68 and secured by a nut 80 as shown in FIG. 5. It will be noted from FIG. 5 that plates 29 and 31 overlap opposite sides of the upper end of support bar 28 ane that bar 28 is pivotably secured to plates 29 and 31 through a pivot pin 82 so that bracket 26 and frame 12 can rotate transversely relative to bar 28 to permit leaning or heeling over of the vehicle body frame during turning. During such leaning, skis 34 and 36 also lean a predetermined degree, due to the described interconnection between skis 34 and 36 and bracket 26 through tie bars 68.

Since support bracket 26 is fixedly secured against lateral movement relative to plate 40 and, vice versa, since plate 40 is likewise secured to the associated ski, transverse rotational movement of bracket 26 effects like movement in bars 68, forcing similar movement of bracket 46, plate 40 and the associated ski. Accordingly, an angle of lean induced in frame 12, as by the driver canting over sideways, induces a like lean in bracket 26 and skis 34 and 36 to effect proper ski action during turning. The skis are not kept flat in such turning but heel over as do a skier's skis. Such improved action results in a faster, smoother, more natural turn with greater safety to the rider. This is contrasted with the "always horizontal" ski alignment in conventional ski vehicles which results in sloppy, snow plowing turns and poor handling performance characteristics.

In order to assure that the same ski angle will be obtained as the lean angle, the radial distance between pivot pin 82 and bolt 78 is maintained the same as the radial distance between bolts 74 and 70, i.e., the same as the distance between the points of connection of the lower end of leg 30 (and 32) to bracket 46 and of the lower end of tie bar 68 to ears 62 and 64. As an example, a uniform radial distance of about 2 inches has been found suitable. If a multiplication or reduction of the ski angle relative to the angle of lean is desired, this ratio of distances (lever arms) may be varied. Also, bar 68 length may be varied.

It will be noted that plate 29 is provided with a cutaway portion or slot 84 in the lower end thereof within which is received a stop pin 86 secured to the front face of bar 28. Accordingly, the extent of permitted lean, i.e., transverse rotation (pivoting around the pivot point in a plane transverse to the longitudinal axis of the vehicle) can be limited, as an added safety precaution.

Limit means may also be provided for skis 34 and 36 to prevent their downward or upward inclination past a predetermined desired point of maximum safety. However, some free upward and downward rotation or movement for the skis is desirable to aid in smoothing out bumps and adjusting the skis to the changing terrain, but digging of the skis into the snow should be avoided. Thus, limit means in the form of a pair of limit blocks 88 and 90 may be disposed on the upper surface of each plate 40 within the channel thereof and below leg bracket 46 so that the underside of bracket 46 strikes one or the other of the blocks, depending on the direction and extent of rotation of plate 40. Thus the height of blocks 88 and 90 can be selected so as to limit upward and downward ski rotation to the desired degree. For example, block 88, i.e., the rear block, can be higher than the forward block 90 to limit downward movement of the nose of the associated ski to a greater extent than upward movement thereof. Thus, blocks 88 and 90 can be set to provide, as shown in FIG. 6, a movement range for each ski of from a 15° angle below horizontal to an angle 30° above horizontal. For most purposes, this is satisfactory. However, another range can easily be selected by utilizing blocks of other heights or repositioning them.

It will be noted in FIG. 1 that the support bar 28 is mounted at a slight angle to the support bracket 26 by virtue of bends in the plates 29, 31. This is represented in the schematic diagram of FIG. 6 with the angle $\alpha$ representing the angle between the line of the forks 26 and the dashed-line extension of the support bar 28. Provision of a slight angle in this fashion improves the stability of the vehicle by adjusting the line of support between the two skis when the vehicle is in a turn, thus compensating for the forward angle of the forks 24. An angle of 5° for the angle $\alpha$ is preferred for the majority of motorcycles having a conventional fork angle. For motorcycles having an extreme fork angle of deviation from the vertical, other magnitudes of the angle $\alpha$ may be desired.

In assembling the front support means of the invention with the remainder of vehicle 10, the front fender and wheel (not shown) of vehicle 10 are first removed and then bracket 26 is secured to vehicle 10 by passing axle bolt 37 through aligned apertures in the lower end of fork 24 and block 35 of bracket 26 and securing it in place. Fork brace 27 can be secured to fork 24 via bolts 92 disposed through suitable apertures in brace 27 and the apertures in fork 24 through which the front fender (not shown), when in place, is secured to fork 24. Inasmuch as the remaining components of the front support means can be already connected to bracket 26 as previously described, vehicle 10 is now assembled in the operative condition shown in FIG. 1.

When it is desired to transport vehicle 10 in the assembled condition, bracket 26 and bar 28 can be locked together by aligning aperture 94 in bar 28 with aperture 96 in plate 29 and inserting a removable lock pin 98 therethrough. Accordingly, the ski support assembly is releasably locked in a supporting position against shifting or pivoting and vehicle 10 is now solidly supported. Vehicle 10 can then be placed in a trailer, truck or the like in the upright position without danger of tipping over.

It will be understood that the front support means of the invention can be fabricated and sold separately for use in converting a conventional two-wheeled vehicle to the ski vehicle of the invention. The front support means is simpler, durable, inexpensive and of improved design and construction.

Such modifications, changes and alterations in the vehicle of the invention and the front support means as are within the scope of the appended claims will be considered to form part of the present invention.

What is claimed is:

1. An improved ski vehicle comprising, in combination:
   a. a body frame for a two-wheeled powered vehicle;
   b. a rear drive and support wheel rotatably secured in said frame;
   c. seat means secured on said frame;
   d. a motor secured to said body frame and driveably interconnected with said wheel;
   e. steering means pivotably connected to said body frame and including:
      1. handle means, and
      2. a front wheel frame defining an axis of a front wheel axle and connected to said handle means; and,
   f. front support means, including:
      1. a bracket secured to said front wheel frame;
      2. a ski support assembly pivotably connected to said bracket at a single pivot point adjacent said front wheel axis for transverse rotation of said bracket and body frame relative to said ski support assembly, said assembly including a pair of spaced depending legs,
      3. a pair of skis, each of said skis being pivotably connected to one of said legs, and
      4. connector means interconnecting each of said skis with said bracket a predetermined distance from said pivot point, whereby transverse rotation of said bracket and body frame relative to said assembly effects rotation of said skis.

2. The improved ski vehicle of claim 1 wherein pivot means secured to the upper surface of each ski pivotably connect each said ski to one of said legs to permit rotation of each ski upwardly and downwardly.

3. The improved ski vehicle of claim 2 wherein the pivot means comprises an upwardly extending, longitudinally aligned channel plate secured to the upper surface of each ski and a pivot bolt disposed transversely through said channel plate and a pivot member mounted to the lower end of the associated leg, whereby the leg is spaced upwardly of the bottom of the channel in said plate, and wherein ski-rotation limit means are interposed between said leg and said channel plate.

4. The improved ski vehicle of claim 3 wherein said ski-rotation limit means include a pair of spaced blocks disposed in said channel, and wherein said pivot member comprises a depending U-bracket, the bottom surface of which is spaced a predetermined distance above said blocks for contact therewith during upward and downward rotation of said ski.

5. The improved ski vehicle of claim 1 wherein said connector means includes a pair of elongated arms, the upper end of each said arm being pivotably connected to said bracket and the lower end of each said arm being pivotably secured at a point lateral of one of said legs to a leg bracket pivotably secured to the lower end of said leg.

6. The improved ski vehicle of claim 5 wherein pivot means secured to the upper surface of each ski are pivotably connected to said leg bracket of the associated leg to permit rotation of each ski upwardly and downwardly.

7. The improved ski vehicle of claim 6 wherein said pivot means comprises an upwardly extending channel plate longitudinally aligned along and secured to the upper surface of each ski, and a pivot bolt disposed transversely through said channel plate and said leg bracket, and wherein ski-rotation limit means are interposed between said leg bracket and channel plate.

8. The improved ski vehicle of claim 7 wherein said ski-rotation limit means comprises a pair of spaced blocks disposed in said channel of said channel plate below said leg bracket for contact therewith during rotation of said ski.

9. The improved ski vehicle of claim 1 wherein stop means disposed on said bracket and ski support assembly cooperatively limit the extent of transverse rotation of said bracket relative to said assembly.

10. The improved ski vehicle of claim 9 wherein said stop means includes a stop bar on said ski support assembly disposed in a slot defined in said bracket.

11. The improved ski vehicle of claim 1 wherein said bracket and said ski support overlap and define a pair of apertures aligned when said bracket and ski support assembly are vertical, and wherein said vehicle includes releasable locking means insertable through said apertures during alignment thereof for releasably locking said bracket and ski support assembly together.

12. Front support means for equipping a two-wheeled vehicle having a single front wheel mounted on an axle extending between the side members of a forked frame with skis, said means including:
   1. a bracket fixedly securable between said forked frame side members on the axis of said front wheel axle;
   2. a ski support assembly pivotably connected to said bracket at a pivot point adjacent said front wheel axis for the transverse rotation of said bracket relative thereto, said assembly including a pair of spaced depending legs angled outwardly from a portion of said assembly affixed to said legs and including said pivot point;
   3. a pair of skis, each of said skis being pivotably connected to one of said legs; and,
   4. connector means interconnecting each of said skis with said bracket a predetermined distance from said pivot point, whereby transverse rotation of said bracket relative to said assembly effects like rotation of said skis.

13. The front support means of claim 12 wherein pivot means secured to the upper surface of each ski pivotably connect each said ski to an associated one of said legs to permit rotation of each ski upwardly and downwardly.

14. The front support means of claim 13 wherein said pivot means comprise an upwardly extending longitudinally aligned channel plate secured to the upper surface of each ski and a pivot bolt disposed transversely through said channel plate and a pivot member mounted to the lower end of the associated leg, whereby said leg is spaced upwardly of the bottom of the channel in said plate, and further including ski-rotation limit means interposed between said leg and said channel plate.

15. The front support means of claim 14 wherein said ski-rotation limit means include a pair of spaced blocks disposed in said channel, and wherein said pivot member comprises a depending U-bracket, the bottom surface of which is spaced a predetermined distance above said blocks for contact therewith during upward and downward rotation of said ski.

16. The front support means of claim 12 wherein said connector means includes a pair of elongated arms, the upper end of each said arm being pivotably connected to said bracket and the lower end of each said arm being pivotably secured at a point lateral of one of said legs to a pivot member pivotably secured to the lower end of said leg.

17. The front support means of claim 16 wherein stop means disposed on said bracket and ski support assembly cooperatively limit the extent of transverse rotation of said bracket relative to said assembly.

18. The front support means of claim 16 wherein said support includes means for releasably locking said bracket and ski support assembly against transverse rotation relative to each other.

19. The front support means of claim 12 wherein the ski support assembly is mounted at a selected angle relative to the bracket in order to provide improved stability of the ski vehicle in a turning mode.

20. The front support means of claim 19 wherein said bracket comprises a pair of generally parallel plates, each having an upper portion generally aligned with the front wheel frame and a lower downwardly depending portion connected to the ski support assembly in line therewith, each plate being bent between the two portions to define said selected angle.

* * * * *